(12) United States Patent
Kreissig et al.

(10) Patent No.: US 6,473,824 B1
(45) Date of Patent: Oct. 29, 2002

(54) DYNAMIC ASSOCIATION OF INPUT/OUTPUT DEVICE WITH APPLICATION PROGRAMS

(75) Inventors: Astrid Kreissig; Gerald Kreissig, both of Herrenberg; Armin Stegerer, Moetzingen, all of (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/416,834

(22) Filed: Oct. 12, 1999

(30) Foreign Application Priority Data

Oct. 14, 1998 (EP) .............................................. 98119423

(51) Int. Cl.[7] .............................. G06F 13/00; G06F 9/54
(52) U.S. Cl. ........................ 710/305; 709/301; 709/321
(58) Field of Search ......................... 710/6, 305, 8–11, 710/18, 19, 104, 105; 713/100; 709/321, 316, 301, 302, 220, 328; 712/220

(56) References Cited

U.S. PATENT DOCUMENTS

| | | | |
|---|---|---|---|
| 5,301,323 A | 4/1994 | Maeurer et al. | 395/650 |
| 5,379,431 A | 1/1995 | Lemon et al. | 395/700 |
| 5,495,610 A | 2/1996 | Shing et al. | 395/600 |
| 5,544,302 A | 8/1996 | Nguyen | 395/161 |
| 5,557,796 A | 9/1996 | Fehskens et al. | 395/650 |
| 5,590,313 A | * 12/1996 | Reynolds et al. | |
| 5,787,246 A | * 7/1998 | Lichtman et al. | |
| 6,336,152 B1 | * 1/2002 | Richman et al. | |

OTHER PUBLICATIONS

Frank Matthijs et al., "A Flexible I/O Framework for Parallel and Distributed Systems," IEEE, pp. 187–190, 1995.

* cited by examiner

*Primary Examiner*—Gopal C. Ray
(74) *Attorney, Agent, or Firm*—Steven W. Roth

(57) ABSTRACT

An object-oriented framework is introduced for coupling device drivers to an application program. Two class trees are introduced: the first class tree comprises the device drivers. The device drivers actually exchange messages with the IO devices. They depend on the protocol used, on the IO interface, and on the operating system. The second class tree comprises the so-called physical objects. Their task is to define parameters that are necessary to describe what an IO device is supposed to do. The parameters only depend on the device's functionality, but not on the protocol, the IO interface or the operating system. In order to couple a physical object with a device driver, the physical object holds a pointer to its device driver. The connection is an "object reference," and therefore, the active device driver may be changed at runtime.

5 Claims, 7 Drawing Sheets

DYNAMIC ASSOCIATION OF INPUT/OUTPUT DEVICE WITH APPLICATION PROGRAMS

BACKGROUND OF THE INVENTION

As soon as a computer, for example a personal computer, has to communicate with an external, real device, a so-called device driver has to be implemented in the program. This device driver has to be able to exchange three kinds of data traffic with the real IO device:

The first kind of data flow exchanged with the device controls the device (control flow), which means that the device's status is either set or obtained from the device. This includes activating and deactivating the device, changing the mode the device is in, and reading error messages from the device.

The second kind of data flow exchanged with the device reads data from the device (read flow). In case the device is a sensor or a measuring apparatus, the data produced by the device has to be transferred to the computer by means of said read flow.

The third kind of data flow exchanged with the device writes data to the device (write flow). This kind of data traffic is the predominant data traffic in case the device is an actuator such as, for example, a robot arm having three axles, a valve, a light, a switch, etc.

There exist different ways of how to attach an IO device to the computer. A standard personal computer possesses at least one serial communication port (COM port) and a parallel printer adapter. To both ports, IO devices may be connected.

A further possibility is to use a fraction of the computer's memory, the IO memory, for communicating with the IO device. The IO device is directly connected to several bits of the IO memory. This is called memory-mapped IO.

Another possibility is to connect the IO device to the computer system via a fieldbus. Several fieldbus systems have developed into well-known standards. One example is the fieldbus Interbus-S of the PHOENIX company, which is an industrial standard bus for connecting analog and digital devices to control applications in a manufacturing environment. There exist various adapter cards for different hardware (PLC, IPC, etc.). Another example is the fieldbus Profibus of the Siemens company. It is used in industrial manufacturing for controlling machine tools, robots, and other kinds of manufacturing equipment. Another standard system, the fieldbus CAN, is a very fast realtime bus system. The period of time until an event is taken care of can be made very short. Therefore, this fast fieldbus is applied in vehicles; for example, for the control of intelligent braking systems like ABS. In France, there exists a standard for fieldbusses called FIP.

The IO device may also be connected to the computer system via a dedicated software layer (for example, the Device Data Management System DDMS) controlling an interface device to which the IO device is connected.

In order to test and debug application programs that control an IO device, it is advantageous to make the application program communicate with a simulation of the IO device. The simulator is a program which simulates the behavior of the real IO device and which communicates with the application program via a certain file. There are visualization tools available (for example, Wonderware, Streamline, etc.) which allow for the simulation of an IO device.

So there exists a lot of possibilities of how to attach an IO device to the computer system. For some of the interfaces described; for example, for the fieldbusses, the protocols that have to be used are well defined. For others, for example, for the COM port and the parallel printer port, a variety of different protocols may be used. Of course, the way the IO device driver communicates with the external device also depends on the computer's operating system (OS/2, Windows, Unix, VxWorks, QNX).

Another aspect of the communication between an external device and the computer system is called realtime behavior. This means that in case a predefined event occurs, this event has to be handled within a predetermined period of time, which may be very short. For example, when a robot aim hits an unexpected obstacle, it is desirable to immediately stop the robot arm's movement.

There exists a variety of prior art solutions for providing object classes having the functionality of IO device drivers. The most common approach is to implement the device drivers as subclasses in a class tree. Another approach is to provide different libraries containing different device drivers, which can be linked with an application program A third approach discussed in the prior art is to declare all the device drivers as external references. A special file is linked with the application which resolves all the external references.

These solutions of the prior art will be thoroughly discussed in the "Detailed Description of the Drawings," together with FIG. 2 and FIG. 3. The main shortcoming of all these approaches is that changing an IO device driver at runtime is not possible.

OBJECT OF THE INVENTION

It is an object of this invention to provide a flexible, object-oriented approach for establishing communication links between an application program and various IO device drivers.

It is another object of this invention to provide a method and means for administrating communication links between an application program and various IO device drivers which allow to exchange an IO device driver at runtime.

SUMMARY OF THE INVENTION

According to the invention, two class trees are introduced: the first class tree comprises the device drivers. The device drivers actually exchange messages with the IO devices. They depend on the protocol used, on the IO interface, and on the operating system. The second class tree comprises the so-called physical objects. Their task is to define parameters that are necessary to describe what an IO device is supposed to do. The parameters only depend on the device's functionality, but not on the protocol, the IO interface or the operating system. In order to couple a physical object with a device driver, the physical object holds a pointer to its device driver. The communication link is provided by a technique called "object reference".

The main advantage of this approach is that the communication link between a physical object and the IO device drivers may be changed at runtime. The user may connect an alternative IO device with a different hardware interface and redirect the IO data to the new IO device and the new IO interface without stopping his application.

Another advantage is that with the two class trees, an open and transparent structure is provided, which can be easily understood and modified by different persons. All the implementation-dependent features are contained in the IO device drivers, and all the functional structures can be found in the physical objects.

Therefore, it is easy to add new device drivers to an existing framework, because even a programmer that is not familiar with a framework finds the information he or she needs at a well-defined location of the framework.

Furtheron, the principles of object-oriented program design are fully obeyed with this approach. While some prior art approaches violated the principle of encapsulation, here this principle is obeyed to.

Another advantage is that a programmer who has to implement a new IO device driver may reuse an existing physical object. He or she just has to design a new IO device driver with the new implementation.

DETAILED DESCRIPTION OF THE INVENTION

Figure 1:
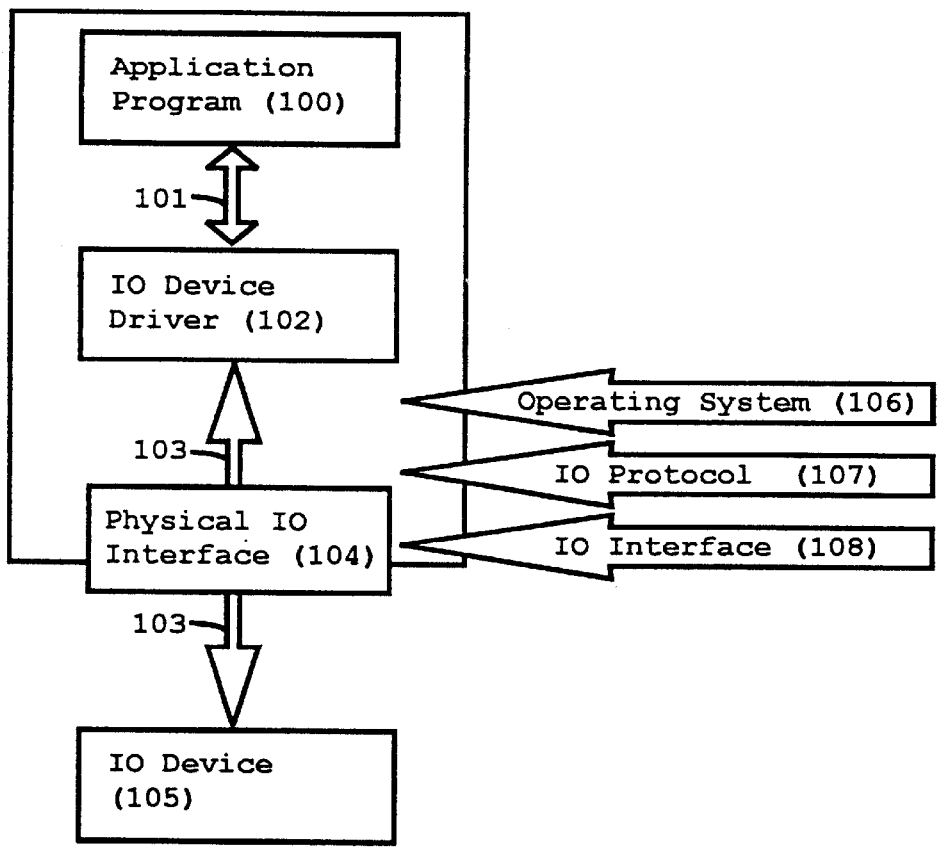
FIG. 1 gives a general view of the data streams between an application program, an IO device driver and the IO device.

In FIG. 1, it is shown schematically how the application program (100), the IO device driver (102), and the IO device (105) interact. The communication 101 between the application program and the IO device driver is independent of the interface the IO device is attached to, and independent of the protocol used by the IO device. Therefore, the data stream 101 is structured according to the parameters that are functionally required for defining what the device is supposed to do. For example, if the device is a robot arm having 3 axles, 3 angles have to be communicated to the IO device driver in order to specify the robot arm's movement. The data stream 101 can be thought of as an implementation-independent representation of the task the IO device has to fufil.

The IO device driver (102) has to translate the implementation-independent data stream into a sequence of commands that obey to the respective definitions of the IO interface (104, 108) and the protocol (107). Also, the computer's operating system (106) has to be taken into account.

The interface 104 to which the IO device is attached to might either be the computer's serial communication port (COM port), or the parallel printer adapter, or, in case memory-mapped IO is used, a fraction of the computer's memory, the so-called IO memory. In case a fieldbus is used, the commands are forwarded to the respective adapter card of the fieldbus. The IO device may also be connected to the computer system via a software layer, such as the Device Data Management System DDMS. In this case, the software layer controls an interface device to which the IO device is connected, and commands have to be passed to the software layer.

The data flow from the IO device driver (102) to the IO device (105) is also shown in FIG. 1. The IO device driver (102) exchanges data (103), via the physical IO interface 104, with the IO device 105, which is attached to said interface (104).

Figure 2:
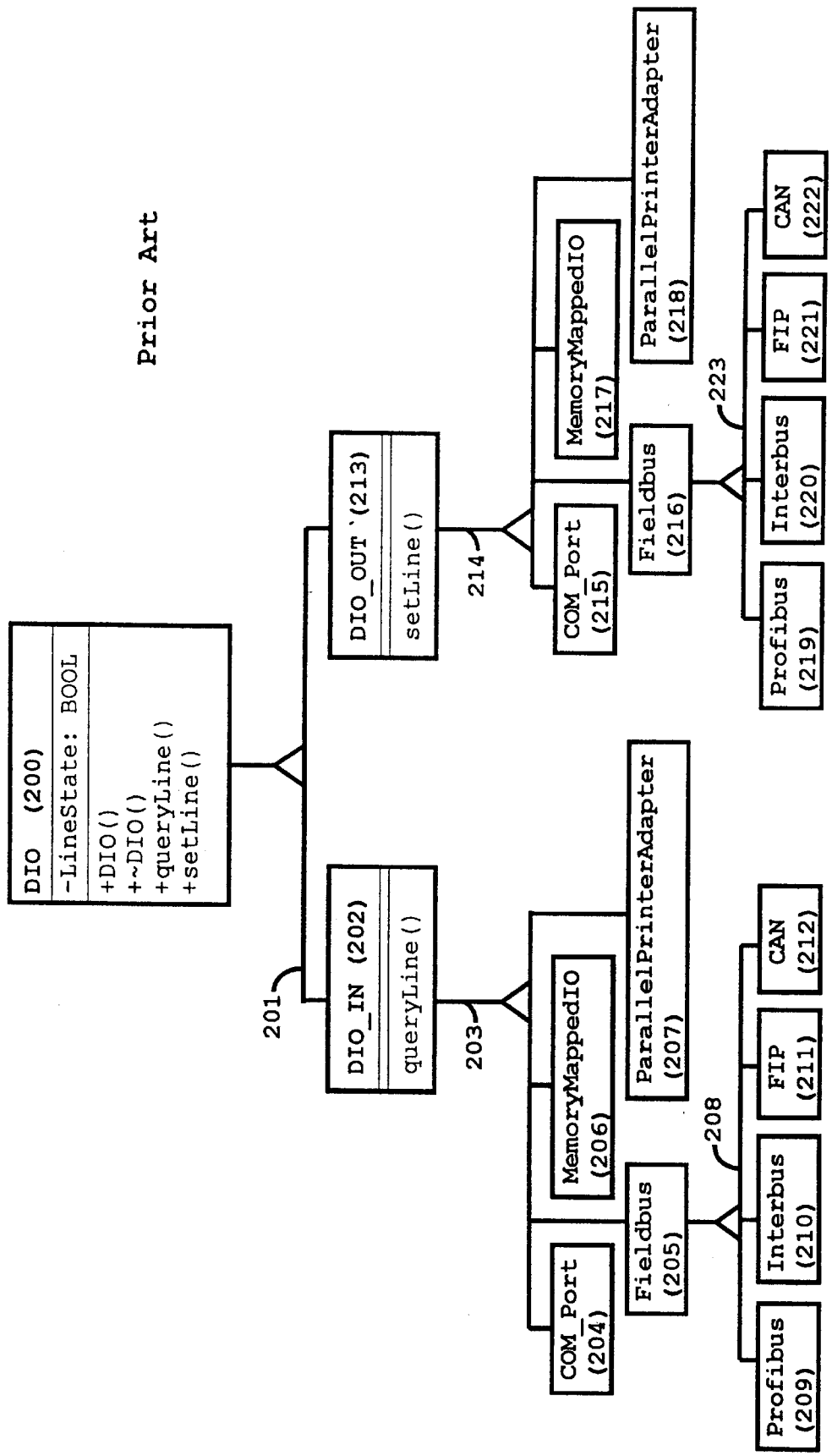
FIG. 2 shows a solution of the prior art where subclasses for handling specific IO devices are contained in a class tree. The subclass representing a certain IO device is chosen and instantiated.

When real IO devices are represented by program constructs in an object oriented system, the IO devices are usually described by means of a class tree. A typical prior art solution that makes use of a class tree is shown in FIG. 2. This class tree is set up for handling a digital IO line. The common features of the domain are associated to the root class (base) 200, and as the specialization continues, more and more subclasses are created to provide access to the specific features of the respective interfaces and protocols.

Both the classes DIO_IN (202) and DIO_OUT (213) inherit (201) from the root class DIO (200), which defines input/output functions that all the objects need. The class DIO_IN (202), and all the other classes that inherit (203) from DIO_IN, contain a function "queryline( )" for querying whether the state of a line is "high" or "low". The class DIO_OUT (213) and all its subclasses contain a function "setline( )" for setting a digital line's state to either "high" or "low".

At the level of the class DIO_IN (202), the function "queryLine( )" is not implemented yet. At this level, the function is a virtual function. It is contained in the "virtual function table" of the class. A class that inherits from a class with a virtual function still has to define said function.

Though inheritance is one of the most common features in object-oriented technology, the following example will clarify the concept. The expression "class B::A" means that class B inherits from class A.

class A
virtual f( ){}
virtual g( ){}
class B::A
f( ){bbb . . . }
g( ){ccc . . . }
class C::A
f( ){ddd . . . }
g( ){eee . . . }

At the level of the root class A, the two virtual functions f( ) and g( ) are introduced. These functions are not implemented at this level yet. Both the classes B and C inherit from class A. At the level of class B, the function f( ) is implemented as {bbb . . . } and the function g( ) is implemented as {ccc . . . }. At the level of class C, the functions f( ) and g( ) are also implemented, but in a different way; f( ) is implemented as {ddd . . . } and g( ) is implemented as {eee . . . }. As both classes B and C inherit from class A, they inherit the interface definitions of the functions f( ) and g( ) from class A, but the actual contents of the two functions may be defined individually.

Let us now consider the left half of FIG. 2 again. At the level of the class DIO_IN (202), the function queryLine( ) is a virtual function. It still has to be defined in one of the subclasses of DIO_IN. The classes COM_Port (204), MemoryMappedIO (206) and ParallelPrinterAdapter (207) contain implementations of the function queryline. The class Fieldbus (205) only contains queryline as a virtual function, because there exist a variety of different fieldbusses requiring different implementations of said function queryline. A separate subclass is introduced for each type of fieldbus, and each of the subclasses ( Profibus (209), Interbus-S (210), FIP (211) and CAN (212) ) inherits (208) from the class Fieldbus (205). The respective implementations of the function queryLine( ) can be found in these subclasses. According to the respective hardware interface and the respective protocol used, the various implementations of the function queryLine( ) generate different sequences of commands and bit patterns for querying a line.

On the right half of FIG. 2, the class DIO_OUT (213) is shown, which also inherits (201) from the root class DIO (200). The class DIO_OUT defines functions for controlling a digital output line. In particular, the function setLinco is defined as a virtual function. The classes 215 to 222 inherit (214, 223) from the class DIO_OUT (213). Implementations of setLine( ) are given in classes 215 and 217 to 222.

When an application programmer wants to use one of these IO device drivers in his program, he or she first has to select the appropriate subclass and instantiate an object of said subclass in his application. The application program may now use the operations and attributes of the device specific object. This binds the application code to the specific device driver chosen. The reusability of the application or part of it is therefore limited to the specific implementation of the selected device driver.

Only the developer of IO device classes benefits from this approach, because he or she can put common behavior of his devices into the root class and concentrate the differences in the subclasses.

To avoid the instantiation of a device specific object in the application, a common practice is to have the device specific classes in separate libraries. Each library offers all the entry points of the abstract base classes and implements them differently to satisfy the needs of the specific device drivers. When the application program is linked with a certain library, the specific IO device driver of this library is bounded to the program By relinking the application with a library that corresponds to a different driver, the same application program can be used with a different IO interface and/or a different protocol.

Figure 3:
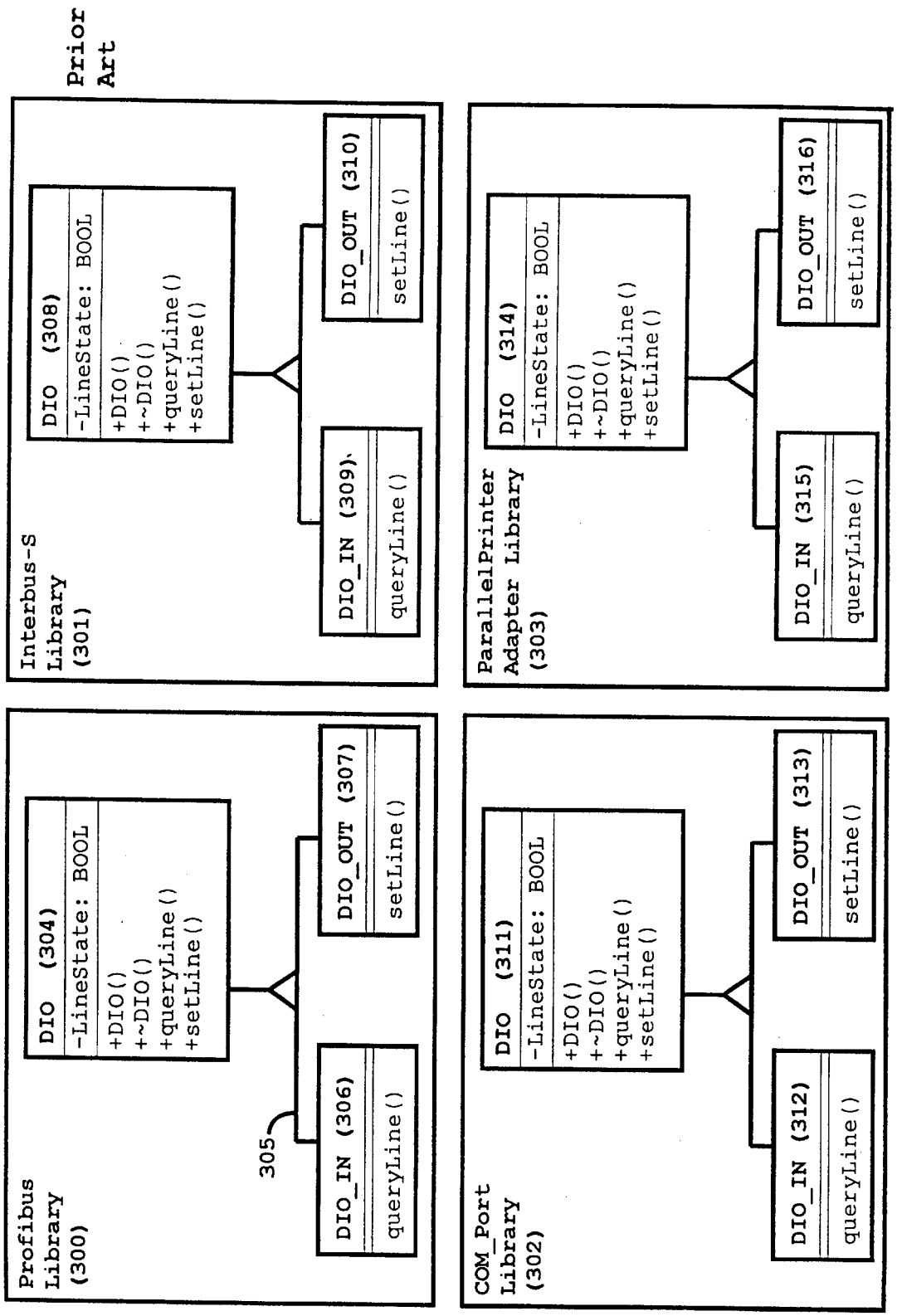
FIG. 3 shows a solution of the prior art where the device specific classes are kept in separate libraries, which can be linked with an application.

FIG. 3 shows how different device drivers for an IO line can be kept in different libraries. Four libraries (300-303) are shown, the Profibus library (300), the Interbus-S library (301), the COM_Port library (302) and the ParailelPrinter-Adapter library (303). Each library contains a root class DIO (304, 308, 311, 314). In each library, two subclasses, the class DIO_IN (306, 309, 312, 315) and the class DIO_OUT (307, 310, 313, 316) inherit from their respective root class DIO. In each library, the root class DIO contains the functions queryLineo and setLineo as virtual functions. These functions are therefore contained in the virtual function table of the root class DIO. The respective device-specific implementation of the function queryLineo is given in the respective subclass DIO_IN, and accordingly, the respective device-specific implementation of the function setLine( ) is given in the respective subclass DIO_OUT.

For example, in the Profibus library (300), the function queryLine of the subclass DIO_IN (306) is implemented according to the Profibus standard. In the Interbus-S library (301), the function queryLine of the subclass DIO_IN (309) looks completely different, because it is implemented according to the Interbus-S standard. As the device specific implementation is called via the entry points in the abstract base classes, which are the same for all the libraries, an application simply addresses the corresponding entry point. Automatically, the current library's implementation of the function that has been called is executed. The programmer of an application program does not have to care about the differences of the various IO device interfaces. He or she only sees the functions entry points, which are common for all the IO libraries, and does not have to provide any references to device specific implementations.

There are two disadvantages with this approach, though. After the application program has been linked with the library, the association between the application and the device specific classes is fixed—it is not possible to reconfigure the application at runtime or to provide a different access path at runtime. Providing a different access path night especially be necessary for fault tolerant systems where the application works with a backup set of devices. Furtheron, once a certain library is chosen, the application may only use one implementation of a certain IO class. An IO object cannot be instantiated with another implementation of said class.

Another approach to allow for a flexible association between an application program and the IO device drivers is to externalize the device dependency. In such a "hybrid" approach, all the device objects are declared as external references. A special definition file is linked with the application which resolves all the external references by instantiating the various implementations of the device objects that the application program needs.

In case the association between the application program and the implementations of the device drivers has to be changed, only the definition file has to be changed.

As the definition file is statically linked with the application program, the user has to recompile and relink the application here as well. A change of the definition file at runtime is not possible. Furtheron, all the IO device objects have to be externalized and, therefore, they are visible at the outmost level of the application. Therefore, this approach violates the principle of encapsulation.

So far, solutions of the prior art have been discussed. The solution provided by the invention allows for a dynamic association of IO device drivers and application programs. This is achieved by means of references which establish a dynamic link between the application program and the device drivers. With this approach, it is possible to reference a different IO device driver at runtime.

In an object-oriented environment, there exists a technique called "object reference" for accessing objects by means of pointers. This technique will be described by means of an example given in FIG. 4. Let us assume that a root class A (401) has been defined which contains two virtual methods f( ) and g( ). The subclasses B (403) and C (404) inherit (402) from class A. Both in subclass B and C, implementations of the functions f( ) and g( ) are given. In subclass B (403), the functions f( ) and g( ) are implemented in a different way than in subclass C (404).

class A
virtual f( ){}
virtual g( ){}
class B::A f( ){bbb ... }
g( ){ccc ... }
class C::A
f( ){ddd ... }
g( ){eee ... }

Furtheron, there is a program "main" (400) which refers to this class tree (401, 403, 404) by means of an "object reference":

main( )
{
A* test
A* b=new B
A* c=new C
if (condition ==TRUE)
   test=b
else
   test=c;
test->g( )
}

The program "main" (400) defines a pointer named "test" (405). Class A only contains virtual functions, though. In order to actually access a function, it will be necessary to direct the pointer "est" to a subclass of A where implementations of the virtual functions are given. For this purpose, a pointer b is defined which points to an instance of subclass B. Accordingly, pointer c points to an instance of subclass C. Depending on some kind of condition, "lest" is either set equal to b or to c. As a result, "test" now either points to an instance of subclass B or to an instance of subclass C. The command "test->g( )" calls the function g( ) of the object instance the pointer "test" points to. In case "test" points to an instance of subclass B, the implementation of g( ) contained in subclass B is called. In case "test" points to an instance of subclass C, the version of g( ) contained in subclass C is called. It is possible to change the instance the pointer "est" points to at runtime.

Figure 5:
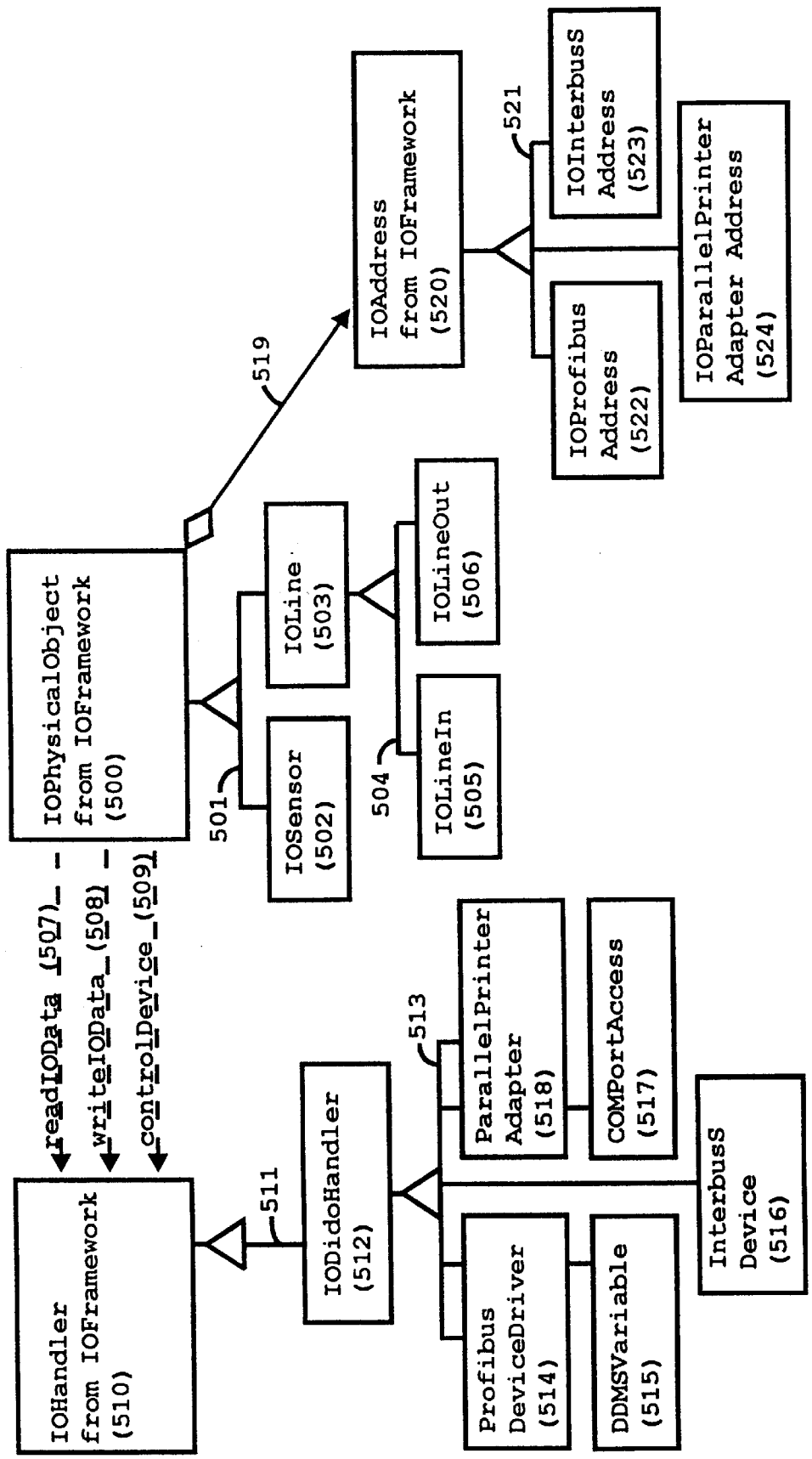
FIG. 5 shows the dependencies between the various objects used in the Realtime Object Oriented Framework, especially between the Physical Objects representing a device's functionality and the IO Handlers.

FIG. 5 shows how the technique "object reference" is able to provide a dynamic association between an application program and a set of IO device drivers. For realizing this approach, the IO devices are classified into IO domains. The classification is done according to the functionality of the IO device. Examples for IO domains are: digital IO, analog IO, counter devices, data collection terminals, kinematics, etc. A so-called "domain object" is used for modeling the typical functionality of the domain.

Though the implementations may vary, IO devices contained in one IO domain show a functional similarity. For example, it is always possible to describe the functional behavior of a robot arm having three axles by a set of parameters comprising several angles and boundary conditions for these angles.

It, therefore, makes sense to model the typical behavior of the IO devices in one domain with a "typical" set of parameters, which do not depend on the actual implementation. In particular, these parameters do not depend on the IO interface the IO device is attached to, on the protocol used or on the computer's operating system.

These parameters are defined and maintained in a Domain object, which can be thought of as an implementation-independent model of the IO devices functional behavior. Because an IO domain object represents a certain group of physical IO devices, it is also called "IO Physical Object".

By defining the relevant parameters for the control of an IO device, the IO physical objects also provide an interface to an application program The values of the parameters in the domain object may either be set or read by the application program For a programmer who wants to communicate with a certain IO device in his application program, things become a lot easier. Let us assume he or she intends to use a counter device in an application program. What has to be done is to instantiate the IO physical object for the domain "counter devices" in the application program In FIG. 5, it is shown that all domain object classes inherit (501) from a common root class IOPhysicalObject (500). The class tree of the domain object classes comprises the classes IOSensor (502), IOLine (503), IOLineIn (505), and IOLineOut (506). IOLineIn (505) contains the functionality of a digital input line, while IOLineOut (506) models a digital output line. The domain classes IOLineIn (505) and IOLineOut (506) both inherit (504) from the class IOLine (503), the parent class for a digital line.

The domain objects must not be confused with the IO device drivers themselves. The methods defined in the domain objects are independent of the interface to the IO device, and they are also independent of the protocol used on said interface. The domain objects only define parameters and boundary conditions for the device's functionality.

Starting from the IO domain objects that have been described so far, a communication path to the IO device has to be defined. Contrary to the IO domain objects (physical objects), the IO Handlers are designed with respect to a certain interface (memory mapped IO, Fieldbus, COM port, ... ), a certain protocol and a certain operating system. An IO Handler contains the respective device driver, which is just 'wrapped' into a standardized object. As can be seen from FIG. 1, the communication between the IO Device Driver (102) and the IO Device is determined by the operating system (107), the interface (108) and the protocol (109). The IO Handler provides a unified interface for an IO domain and maps the requests from the generic IO domain object into the equivalent and appropriate calls to the IO device.

Several IO Handlers are shown in FIG. 5. There is an IO Handler for the Profibus (514), and for the Interbus-S (516), which are both well-known fieldbusses, and an IO Handler for accessing the COM port (COMPortAccess, 517), and one for accessing the Parallel Printer Adapter (518). The Device Data Management System DDMS is a software layer for controlling an interface device. An IO device may be connected to said interface device. Via the IO Handler DDMSVariable (515), it is possible to exchange data with the DDMS layer and the attached IO device. All the IO Handlers inherit (513) from the object class IODidoHandler (512), which itself inherits (511) from the root class IOHandler (510).

According to the invention, the access from the IO domain object to the IO Handlers is implemented as an "object reference", which means that the IO physical object defines a pointer to the root class of the IO Handlers, IOHandler (5IO).

Figure 4:
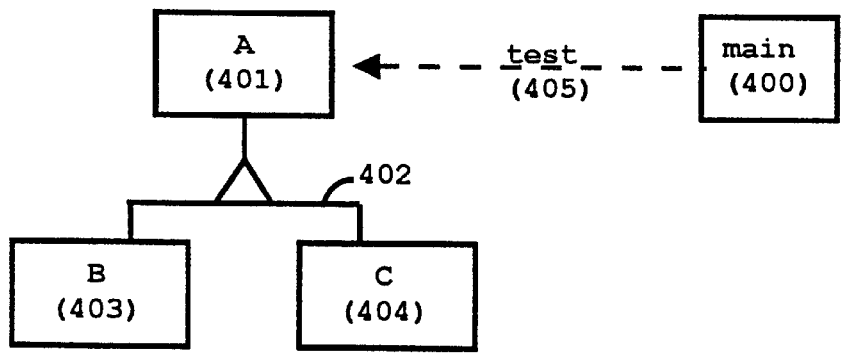
FIG. 4 shows how an "object reference" is established between an IOPhysicalObject and a class tree comprising the classes A, B, and C.

The class IOHandler corresponds to class A (401) of FIG. 4. In FIG. 4, the program "main" (400) accesses either class B or C (403, 404) via a pointer "test" (405), though this pointer is initially defined as a pointer to class A, because this definition is just a definition of the pointer's type. Therefore, the pointer "test" may be set to either class B or class C.

This implies that also in FIG. 5, the pointer may initially be defined with respect to the root class IOHandler (51 0). Nevertheless it can then be set to any subclass of said root class 510. Therefore, it is possible to set the pointer to any of the IO Handlers; for example, to the Profibus Device-Driver (514).

With this approach, it is possible to change the communication path between an IO domain object and its associated device driver at runtime. Let us assume that the IO domain object IOLineIn (505) is associated—by means of a pointer—with the Interbus-S device. IOLineIn (505) can query the state of a digital line connected to the Interbus-S. It is then possible to remove this link and to set the pointer of IOLineIn to a different IO Handler at runtime. For example, it is possible to set the pointer to the IO Handler COMPortAccess (517). The physical object IOLineIn (505) may now query a digital line connected to the COM port. It is no longer possible to query the line at the Interbus-S.

Each of the physical objects may use a standard set of methods for exchanging data with an IO Handler. These methods are defined as virtual methods at the class IOPhysicalObject (500). The actual implementation is given within the respective physical object.

In FIG. 5, the three functions controlDevice( ) (509), readIOData( ) (507) and writeIOData( ) (508) are shown. The function controlDevice( ) (509) allows to exchange control parameters with the IO Handler, in order to perform domain specific device operations. By means of the function readIOData( ) (507), the physical object may read data from the device in a domain specific representation. Whenever the IO physical object has to write data to the IO device, the function writeIOData( ) (508) is called. These IO operations are sufficient because all domain specific information is exchanged as a set of parameters, which is only defined within an IO domain. Only the IO Handler for a specific device knows how to transform this domain information into the appropriate device driver calls.

Let us next consider the functions defined within an IO Handler. An IO Handler for a specific domain has to be implemented as a subclass of the base IO Handler class. This class provides features common for all IO Handlers like polling the device, reacting on an interrupt.

registration mechanisms for the IO Domain objects, access to the IO Configurator, etc.

The developer of an IO Handler for a specific IO Domain must write a subclass and must specify the body for a set of virtual methods defined in the base IO Handler class. One function to be specified is the function initIOHandler, which gives the subclasses the opportunity to do special initialization of the IO devices during the initialization of the IO Handler. The function handleIOEvent gives the subclasses the opportunity to do device specific handling of the IO event before the registered objects are informed about the event, while the function completeIOEvent permits to the subclasses to do device specific completion of an IO event after the registered objects processed the event.

Additionally, the IO Handler must be able to deal with requests from the corresponding physical object concerning the functions controldevice (509), readIOData (507) and writeIOData (508), which have been described above.

Whenever an IO domain object of any subclass of the base IOPhysicalObject class 500 is instantiated, it obtains a unique logical address. This address is wrapped in an address object (IOAddress, 520). There exist several subclasses (522, 523, 524) to the base IOAddress class, which implement different address formats. The respective address object is possessed (519) by the physical object IOPhysicalObject (500), which means that the address object is completely contained in the physical object.

Figure 6:
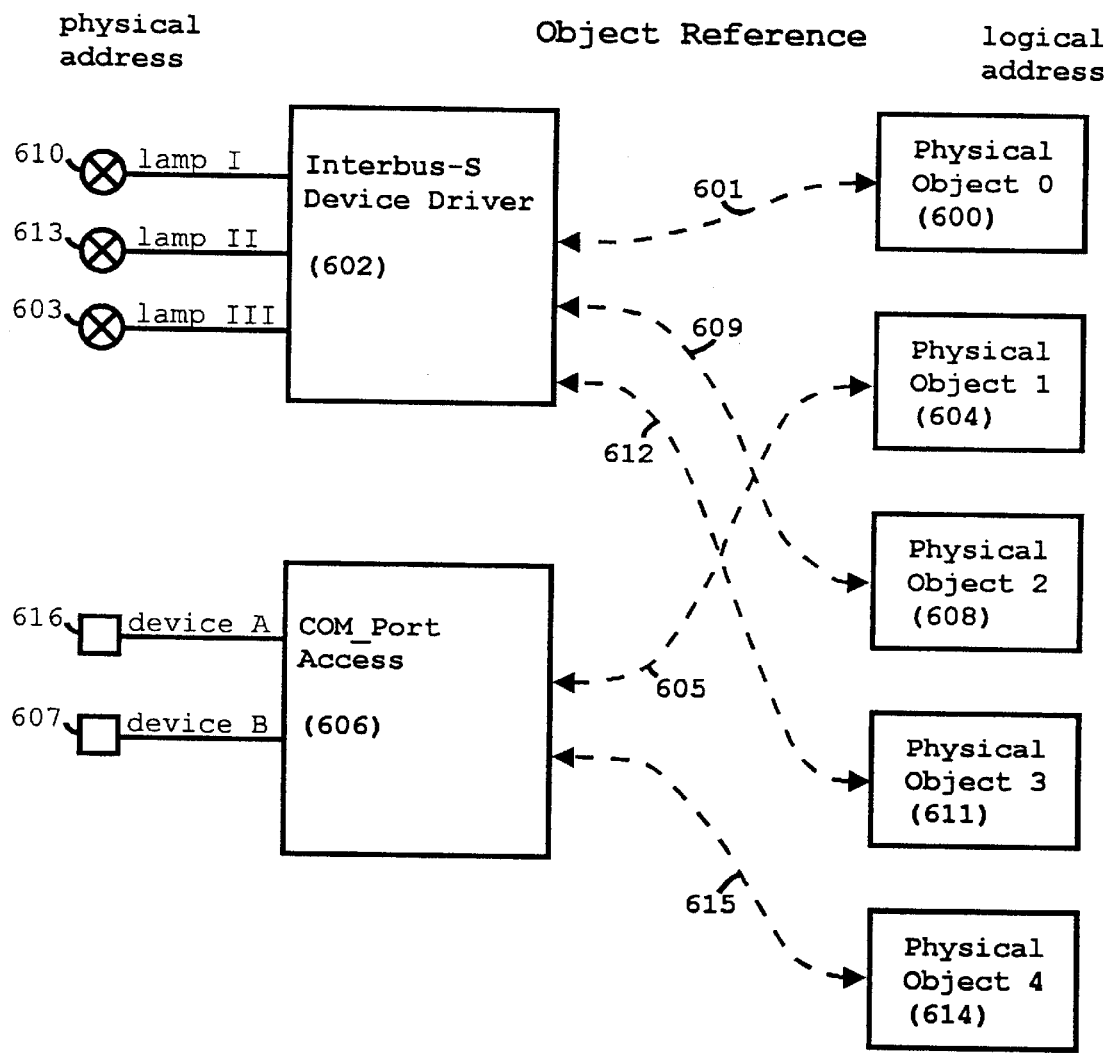
FIG. 6 shows a number of instances of Physical Objects which communicate with their corresponding IO Handlers. In order to access a certain IO device, logical addresses have to be mapped to physical addresses.

In FIG. 6, the interactions of a multitude of physical objects and IO Handlers are shown. For each device that has to be controlled, a new physical object with a new logical address is instantiated. The corresponding IO Handlers, for example the Interbus-S, may be shared among different physical objects. Therefore, the corresponding IO Handler only has to be instantiated in case it doesn't exist yet. It is not necessary to provide multiple copies of one and the same IO Handler.

PhysicalObject 0 (600) is the physical object with the logical address 0. It possesses a pointer for establishing a communication link (601) with the Interbus-S DeviceDriver 602. Physical Object 0 (600) controls the lamp 603, which is connected to the fieldbus Interbus-S, and which has the physical address "lamp III".

In FIG. 6, two more physical objects (608, 611) are shown that also communicate with the Interbus-S DeviceDriver 602. Each of these physical objects addresses a different IO device having a different physical address. Physical Object 2 (608) communicates (609) with the Interbus-S DeviceDriver 602 and controls lamp 610, which has the physical address "lamp I." Physical Object 3 (611) controls (612) the lamp 613 with the physical address "lamp II".

The two remaining physical objects, Physical Object 1 (604) and Physical Object 4 (614), control devices that are attached to the COM port. Therefore, they communicate (605, 615) with the IO Handler COM_Port Access (606). Physical Object 1 (604) controls device 607 with the physical address "device B," and Physical Object 4 (614) controls device 616 with the physical address "device A".

For each device, there exists a physical object with a unique logical address that controls said device. This physical object only communicates with the IO Handler the corresponding device is attached to. This IO Handler is responsible for all the devices attached to the IO interface controlled by the IO Handler. Therefore the IO Handler may be shared among different physical objects. The physical object's logical address is mapped to one specific IO Handler and to a specific physical address of a device controlled by said IO Handler. The following table summarizes the assignment of logical addresses to IO Handlers and physical device addresses for the example given in FIG. 6.

| Logical Address | IO Handler | Physical Address |
| --- | --- | --- |
| Physical Object 0 | Interbus-S | lamp III |
| Physical Object 1 | COM Port | device B |
| Physical Object 2 | Interbus-S | lamp I |
| Physical Object 3 | Interbus-S | lamp II |
| Physical Object 4 | COM Port | device A |

The information of this table is the content of the so-called resource file, which has to be specified by the user. Besides the resource file, there exists a class of configurator objects which are responsible for providing each Physical Object with its IO Handler, and with the physical address of its IO device. They are responsible for the administration of the assignments given in the resource file.

The class of configurator objects comprises a root class, the Domain Configurator, and several IO Configurators which inherit from the Domain Configurator. For each IO Handler, there exists a unique IO Configurator; for example, there is an IO Configurator for the Interbus-S, an IO Configurator for the Profibus DeviceDriver, etc. When the application program is started, a set of IO Configurators is instantiated immediately, according to the specifications given in the resource file. In the example of FIG. 6, two IO Handlers (for the Interbus-S and for the COM Port) are specified in the resource file, and therefore, the IO Configurators for the Interbus-S and for the COM Port are instantiated immediately when the program is started.

Figure 7:
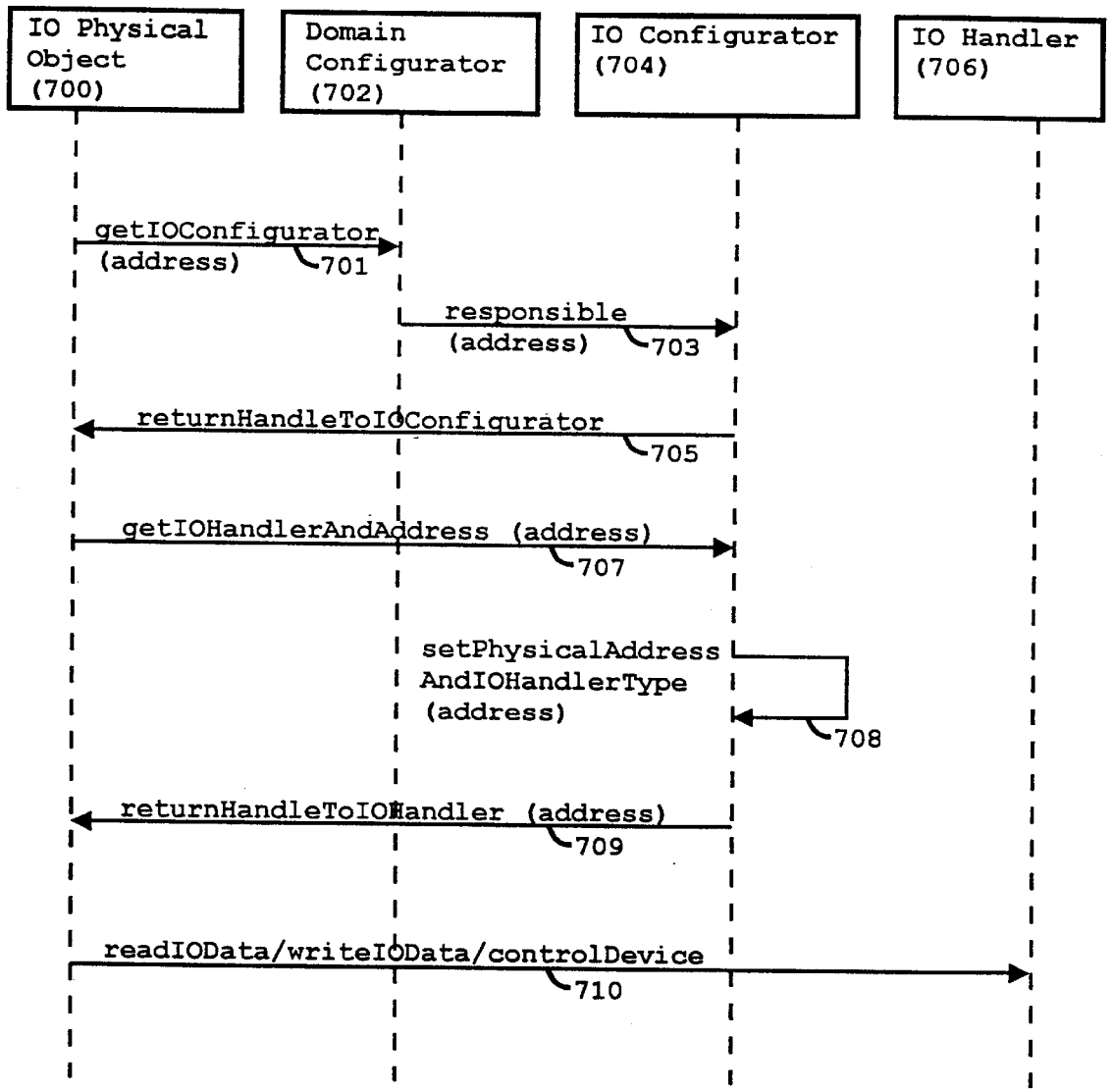
FIG. 7 shows the communication between a physical object and the configurator object, which provides the physical object with a pointer to its responsible IO Handler, and with the physical address of its IO device.

When a Physical Object is instantiated, it is given its logical address. FIG. 7 shows the steps of the routine "translateLogicalToReal," which is responsible for providing a Physical Object with the pointer to its IO Handler, and with the physical address of its IO device.

In the first step of said routine, the IO Physical Object (700) sends a message "getIOConfigurator" (701), together with its logical address, to the Domain Configurator (702). The Domain configurator, which is the root class of the configurator class tree, knows which IO Configurator is responsible for the Physical Object 700. It sends a "responsible" message (703), together with the logical address, to the responsible IO Configurator 704. In the next step, "returnHandleToIOConfigurator" (705), the IO Configurator provides the IO Physical Object with a pointer to its IO Configurator. Therefore, the IO Physical Object may now address its IO Configurator directly.

In the next step, the IO Physical Object (700) sends the message "getIOHandlerAndAddress" (707), together with its logical address, to the IO Configurator (704). The IO Configurator first checks whether the IO Handler associated with the logical address has already been instantiated. In case it doesn't exist yet, the IO Handler is instantiated now.

The IO Physical Object (700) possesses an object of the type IOAddress. So far, said address object contains the IO Physical Object's logical address. In the next step, "setPhysicalAddress-AndIOHandlerType" (708), this logical address contained in the Physical Object is overwritten with the physical address. This implies that the step of address translation is only required once. Future accesses of the IO Physical Object to the IO Handler can take place without an address translation, because from now on the IO Physical Object knows the physical address of its IO device. In the next step, "returnHandleToIOHandler" (709), the IO Physical Object (700) obtains a pointer to its corresponding IO Handler 706. Now the IO Physical Object (700) can directly access its IO Handler (706) by means of an "object reference", because it possesses both the pointer to said IO Handler and the physical address of the IO device to be controlled. Step 710 shows an example of an access of the IO Physical Object to the IO Handler 706. The IO Physical Object may read data from ("readIOData") or write data to ("writeIOData") the associated IO Handler, and thus to the associated IO device. It may also send control messages to the IO device ("controlDevice"). The communication path between the IO Physical Object (700) and the IO Handler (706) is now established. The IO Configurator (704) has fulfilled its task and is not required any more. As soon as the user intends to link a different IO Handler with the IO Physical Object 700, though, the IO Configurator is required again. It has to provide the IO Physical Object with a pointer to the new IO Handler and with a new physical address. Such a change of the configuration is possible at runtime.

Figure 8:
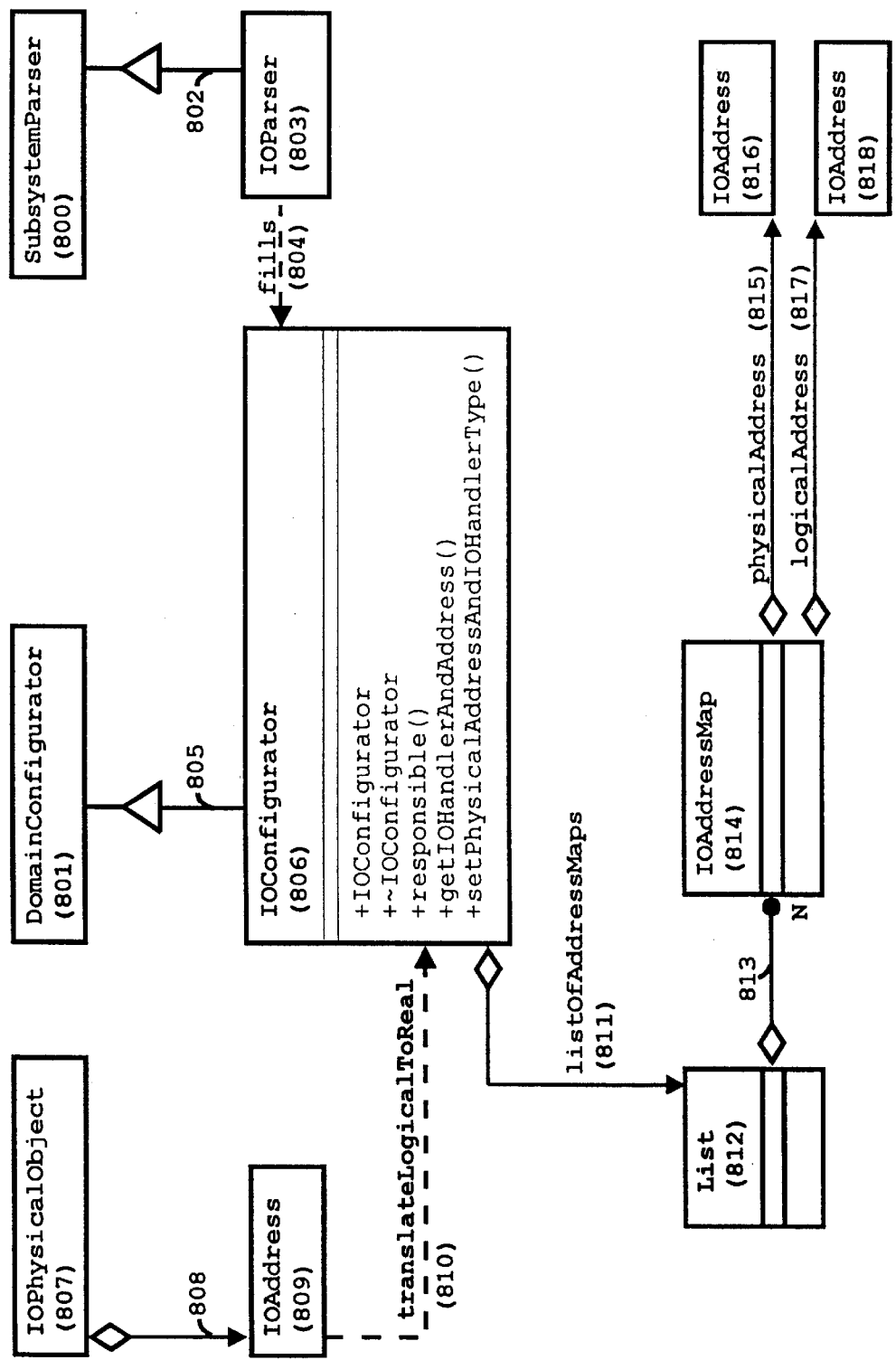
FIG. 8 shows how various configurators corresponding to different IO domains are invoked by an IO Parser. Each configurator holds a list for mapping logical addresses to physical addresses.

It has already been mentioned that each IO Configurator corresponds to a certain IO Handler (for example, to the IO Handler for the Interbus-S). When the program is started, a whole set of IO Configurators is instantiated, according to the information provided in the resource file. The way this is accomplished is shown in FIG. 8. First, the Subsystem Parser 800 and the Domain Configurator 801 are instantiated. The Subsystem Parser parses the resource file, in order to determine which IO Handlers have to be instantiated. For each IO Handler required, a separate IO Parser (IOParser, 803) is instantiated, which inherits (802) from the Subsystemparser (800). Besides that, for each IO Handler required, an IO Configurator (806) is instantiated, which inherits (805) from the root configurator object, the Domain Configurator 801.

Let us assume that the IO Configurator 806 corresponds to the COM Port. All Physical Objects that control IO devices attached to the COM Port forward their logical addresses to the IO Configurator 806 and obtain their physical addresses from there. For example, the IO Physical Object 807 possesses (808) an object of the type IOAddress (809), which at first contains the Physical Object's logical address. Next, the routine of FIG. 7 is carried out. In FIG. 8, the whole routine of FIG. 7 is referred to as "translateLogicalToRea" (8IO). In the step "setPhysicalAddress-AndIOHandlerType" (708) of FIG. 7, the content of the IO Address object 809 is overwritten with the physical address.

The IO Configurator (806) is responsible for mapping the logical addresses to the physical addresses. For this purpose, the IO Configurator possesses (811) a list (812) of address maps. Said list (811) possesses (813) N objects of the type "IOAddressMaps" (814), whereby each of said address maps comprises (815, 817) two objects of the type "IOAddress" (816, 818). One of these objects "IOAddress" (818) contains the logical address and the second one (816) contains the corresponding physical address. Initially, the assignment of logical addresses to both IO Handlers and physical addresses is only contained in the resource file. This resource file is parsed by the object "IODidoParser" (803), and therefore, this parser has to "fill" (804) the IO Address objects (816, 818) of the various Address Maps with the required logical and physical addresses.

What is claimed is:

1. An object-oriented framework in memory of a computer system, said framework providing a communication path between an application program and IO devices attached to said computer system, each IO device being connected to a certain IO interface and utilizing a certain IO protocol for exchanging messages with said computer system, said framework comprising:

a first class tree comprising a set of physical objects, said physical objects defining parameters for data exchange with the application program, said parameters being independent of the IO device's IO protocol and of the IO interface the IO device is attached to, a second class tree comprising a set of IO device drivers, said IO device drivers being designed for a certain IO interface and a certain IO protocol, and said IO device drivers being capable of exchanging messages in said IO protocol via said IO interface with the IO device attached to said IO interface, and means for establishing and changing an object reference between any of said physical objects and any of said device drivers at runtime, whereby said physical object maintains a pointer to its corresponding device driver.

2. An object-oriented framework according to claim 1, said framework further comprising a resource file specifying the IO devices attached to the computer system and the IO device driver required for each IO device.

3. An object-oriented framework according to claim 1 or claim 2, said framework further comprising a configurator object, for providing, after having obtained a physical object's logical address, said physical object with a pointer to the corresponding IO device driver and with the physical address of the IO device that said physical object is supposed to control.

4. A computer-implemented method for establishing a communication path between an application program and an Input/Output (IO) device that is attached to a computer system, said IO device being connected to a certain IO interface and utilizing a certain IO protocol for exchanging messages with said computer system, said method comprising the steps of:

instantiating a physical object from a first class tree comprising a set of physical objects, said physical object being instantiated based on functionality information about said IO device;

instantiating an IO device driver from a second class tree comprising a set of IO device drivers, said IO device driver being instantiated based on IO interface information and IO protocol information about said IO device; and establishing an object reference between said physical object and said IO device driver at runtime, whereby said physical object maintains a pointer to said IO device driver.

5. A method for establishing a communication path according to claim 4 wherein said step of establishing an object reference between said physical object and said device driver comprising the steps of:

forwarding said physical object's logical address from said physical object to a configurator object; and returning, from said configurator object to said physical object, a pointer to said IO device driver and a physical address of said IO device that said physical object is supposed to control.

* * * * *